(12) United States Patent
Okamoto (10) Patent No.: US 6,289,429 B2
(45) Date of Patent: *Sep. 11, 2001

(54) ACCESSING MULTIPLE MEMORIES USING ADDRESS CONVERSION AMONG MULTIPLE ADDRESSES

(75) Inventor: Minoru Okamoto, Suita (JP)

(73) Assignee: Matsushita Electric Industrial Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,711

(22) Filed: Mar. 6, 1997

(30) Foreign Application Priority Data

Mar. 11, 1996 (JP) .................................................. 8-052786

(51) Int. Cl.[7] ..................................................... G06F 12/00
(52) U.S. Cl. ............................... 711/202; 711/5; 711/148
(58) Field of Search ................................ 711/5, 1, 2, 147, 711/148, 200, 202

(56) References Cited

U.S. PATENT DOCUMENTS 4,234,934   11/1980   Thorsrud ............................... 364/900

FOREIGN PATENT DOCUMENTS 5260374   10/1993   (JP) .

OTHER PUBLICATIONS

European Search Report for Application No. 97103737.9; Dated May 28, 1997.

*Primary Examiner*—Kevin Verbrugge
(74) *Attorney, Agent, or Firm*—Renner, Otto, Boisselle & Sklar, LLP (57) ABSTRACT

A memory device including a first memory and a second memory. A first processor generates a first address for defining a location to be accessed in the first memory and a second address for defining a location to be accessed in the second memory. A second processor generates a third address. A memory control section controls access to the first memory and access to the second memory. The memory control section includes an address conversion section for converting the third address so as to represent either one of the first address and the second address.

22 Claims, 7 Drawing Sheets

| Input | | Output | | | |
|---|---|---|---|---|---|
| Control signal 117 | Address 114 (814) | Control signal 154 (554) | Control signal 164 (564) | Address 152 (552) | Address 162 (562) |
| Active (Reading) | 0000h~03FFh | Active (Reading) | Not active | Address 114 | Not output |
| Active (Writing) | 0000h~03FFh | Active (Writing) | Not active | Address 114 | Not output |
| Active (Reading) | 0400h~ | Not active | Active (Reading) | Not output | Address 114-0400h |
| Active (Writing) | 0400h~ | Not active | Active (Writing) | Not output | Address 114-0400h |
| Not active | Any address | Control signal 134 | Control signal 135 | Address 124 | Address 125 |

ACCESSING MULTIPLE MEMORIES USING ADDRESS CONVERSION AMONG MULTIPLE ADDRESSES

BACKGROUND OF THE INVENTION

1. Field of the Invention

The present invention relates to a memory device and a method for accessing memories of the memory device.

2. Description of the Related Art

Conventionally, a type of LSIs (large scale integrated circuits) referred to as DSPs (digital signal processors) are mounted in various types of apparatuses as digital signals are processed in more and more fields. A DSP executes arithmetic operations of digital signals at high efficiency, and thus generally includes a mechanism for reading data corresponding to a plurality of words (two words in most cases) within one machine cycle. A CPU (central processing unit) is mounted in an apparatus together with the DSP for the purpose of controlling various peripheral circuits including the DSP. A CPU mainly performs determinations on various conditions and logic operations, and thus generally reads data corresponding to one word within one machine cycle.

Figure 7:
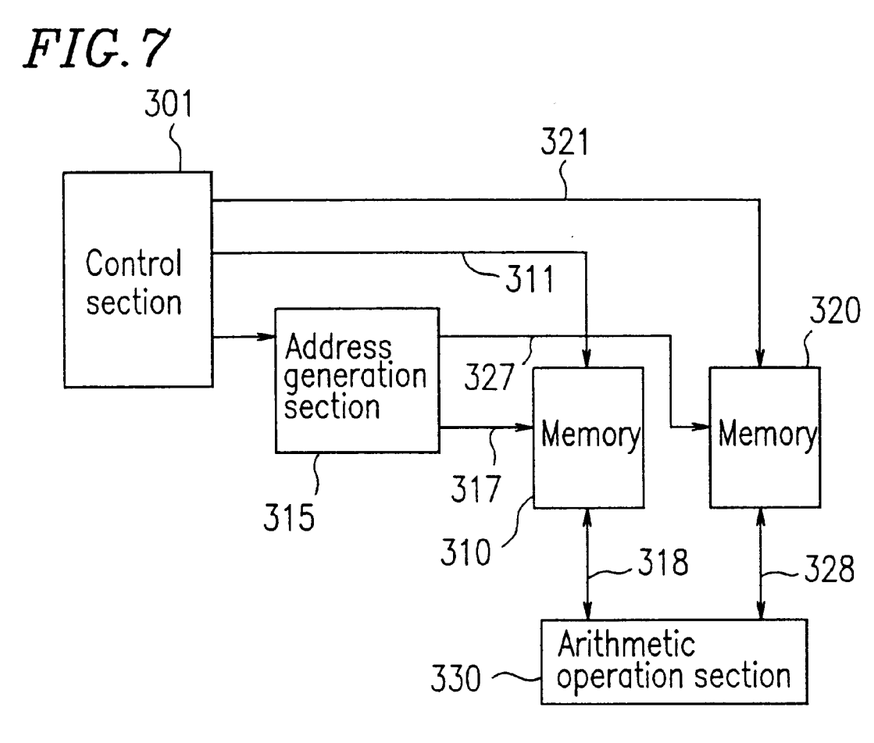
FIG. 7 shows a structure of a conventional DSP.

Now, with reference to FIG. 7, an exemplary operation of the DSP for reading data from a memory will be described.

An instruction (not shown) is input to a control section 301. When the instruction input to the control section 301 instructs reading of data from two memories 310 and 320, the control section 301 instructs an address generation section 315 to output two addresses 317 and 327 to the memories 310 and 320, respectively. The address 317 defines the location of the data to be read in the memory 310. The address 327 defines the location of the data to be read in the memory 320.

The address generation section 315 outputs the address 317 to the memory 310 and outputs the address 327 to the memory 320. The address 317 has, for example, value 0002h. The address 327 has, for example, value 0003h. Herein, letter "h" indicates that the value of the address is represented hexadecimally.

The values of the addresses 317 and 327 output by the address generation section 315 are in the range from 0000h to the maximum possible values which are respectively defined by the memory capacities of the memories 310 and 320. When the memory capacity of the memory 310 is 1K words, the address generation section 315 outputs the address 317 having a value in the range from 0000h to 03FFh to the memory 310.

The control section 301 activates a read signal 311 for the memory 310 and also activates a read signal 321 for the memory 320.

When the read signal 311 is active, the memory 310 outputs data 318 stored at the location designated by the address 317 (for example, 0002h) to an arithmetic operation section 330. Similarly, when the read signal 321 is active, the memory 320 outputs data 328 stored at the location designated by the address 327 (for example, 0003h) to the arithmetic operation section 330.

The arithmetic operation section 330 executes an arithmetic operation based on the data 318 and 328.

As described above, the CPU accesses the memory on the one-word-within-one-machine-cycle basis. The method for designating the location of the data in the memory by the CPU is different from the method for designating the location of the data in the memory by the DSP in that the CPU designates the location of the data in the memory to be accessed using one address.

The technologies for microscopic processing of the LSIs have been developed rapidly, and today it is possible to integrate a CPU and a DSP, which designate the location of the data in the memory in different manners, on one chip.

However, the above-described system is disadvantageous as to the following point. In the case where the CPU and the DSP, which respectively designate the location of data in the memory in different manners, are integrated on one chip and the DSP and the CPU both access the memories 310 and 320, either one of the memories 310 and 320 which are accessible by the DSP is not accessible by the CPU. The reason is that, since the address is designated for the locations in each of the memories 310 and 320 from 0000h, the CPU can designate the location of the data only in one memory 310 or 320.

Furthermore, in the case where the CPU writes the data corresponding to two words to the memory (for example, the memory 310) and then the DSP performs an arithmetic operation of the data corresponding to the two words, the DSP needs to transfer the data corresponding to one of the two words to the other memory (for example, the memory 320). The above-described system is also disadvantageous in that execution of such processing which is not related to the arithmetic operation may spoil the performance of the DSP.

SUMMARY OF THE INVENTION

According to one aspect of the invention, a memory device includes a first memory; a second memory; a first processor for generating a first address for defining a location to be accessed in the first memory and a second address for defining a location to be accessed in the second memory; a second processor for generating a third address; and a memory control section for controlling access to the first memory and access to the second memory, the memory control section including an address conversion section for converting the third address so as to represent either one of the first address and the second address.

In one embodiment of the invention, the address conversion section converts the third address so as to represent one of the first address and the second address by subtracting a prescribed value from a value of the third address.

In another embodiment of the invention, the address conversion section converts the third address so as to represent one of the first address and the second address by setting a prescribed bit of the third address to either one of "1" and "0".

In still another embodiment of the invention, the first processor, the second processor and the memory control section are provided on a single semiconductor chip.

In yet another embodiment of the invention, the first memory and the second memory are each a single-port memory.

According to another aspect of the invention, a memory device includes a first memory; a second memory; a processor for generating a first address for defining a location to be accessed in the first memory, a second address for defining a location to be accessed in the second memory, and a third address; and a memory control section for controlling access to the first memory and access to the second memory, the memory control section including an address conversion section for converting the third address so as to represent either one of the first address and the second address.

According to still another aspect of the invention, a method for accessing a first memory and a second memory in a memory device includes the steps of generating a first address for defining a location to be accessed in the first memory and a second address for defining a location to be accessed in the second memory; generating a third address; and controlling access to the first memory and access to the second memory. The step of controlling includes the step of converting the third address so as to represent either one of the first address and the second address.

In one embodiment of the invention, the step of converting includes the step of subtracting a prescribed value from a value of the third address.

In another embodiment of the invention, the step of converting includes the step of setting a prescribed bit of the third address to either one of "1" and "0".

Thus, the invention described herein makes possible the advantages of (1) providing a memory device and a method for accessing memories of the memory device for realizing efficient memory access from a CPU and a DSP in the case where the CPU generates one address and the DSP generates two addresses, and (2) providing a memory device and a method for accessing memories of the memory device for realizing efficient memory access in the case where a processor generates one address and two addresses.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting, examples with reference to the accompanying drawings.

EXAMPLE 1

Figure 1:
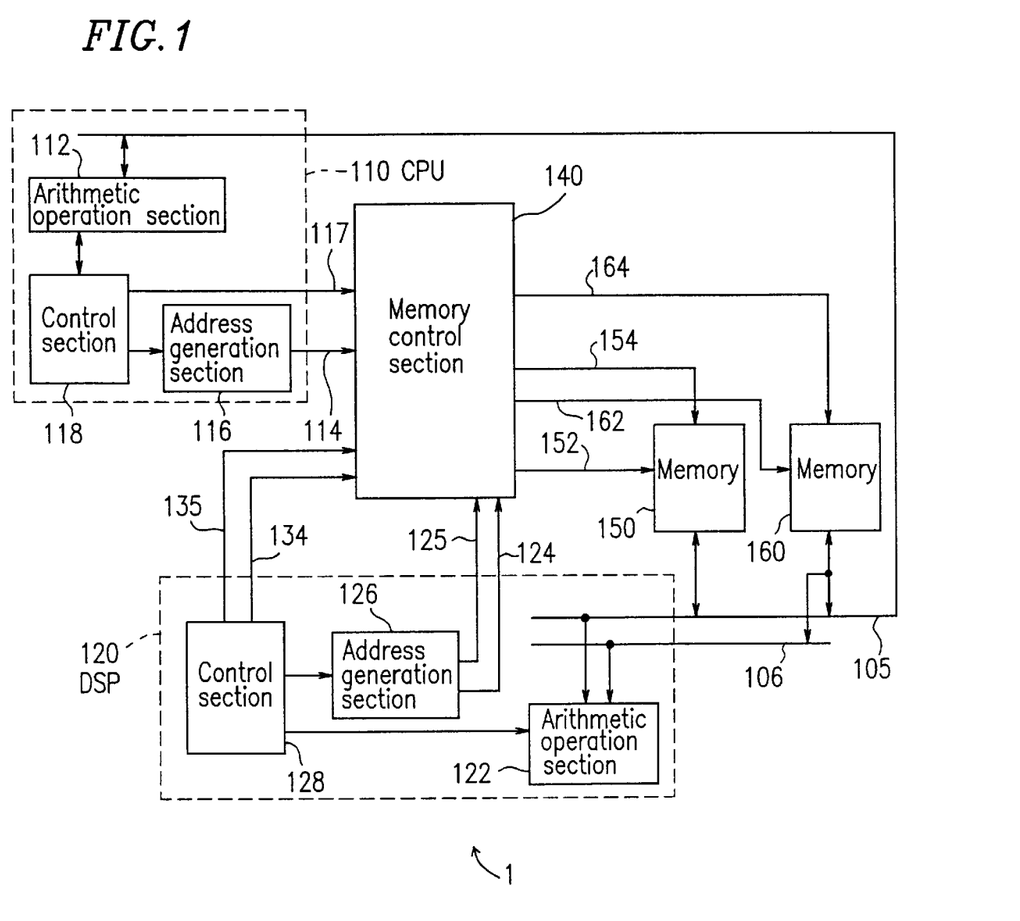
FIG. 1 is a block diagram of a memory device according to a first example of the present invention.

FIG. 1 is a block diagram of a memory 1 according to a first example of the present invention.

As shown in FIG. 1, the memory device 1 includes memories 150 and 160. The memories 150 and 160 are each a single-port memory.

The memory device 1 further includes a CPU 110, a DSP 120 and a memory control section 140.

The CPU 110 is connected to the memories 150 and via a data bus 105.

The CPU 110 includes an arithmetic operation section 112, an address generation section 116 and a control section 118.

The arithmetic operation section 112 processes data which is input to the arithmetic operation section 112 via the data bus 105.

The address generation section 116 generates an address 114. The address 114 defines a location to be accessed in the memory 150 or a location to be accessed in the memory 160. The address 114 is represented by, for example, 16-bit data.

The control section 118 outputs a control signal 117 which instructs reading or writing of data to the memory control section 140. The control section 118 also controls the arithmetic operation section 112 and the address generation section 116.

The DSP 120 is connected to the memory 150 via the data bus 105 and is connected to the memory 160 via the data bus 106.

The DSP 120 includes an arithmetic operation section 122, an address generation section 126 and a control section 128.

The arithmetic operation section 122 processes data which is input to the arithmetic operation section 122 via the data buses 105 and 106.

The address generation section 126 generates two addresses 124 and 125, which are independent from each other. The address 124 defines a location to be accessed in the memory 150, and the address 125 defines a location to be accessed in the memory 160. The addresses 124 and 125 are each represented by, for example, 16-bit data.

The control section 128 outputs two control signals 134 and 135 which instruct reading or writing of data to the memory control section 140. The control signals 134 and 135 are independent from each other. The control section 128 also controls the arithmetic operation section 122 and the address generation section 126.

The memory control section 140 controls access to the memory 150 and also access to the memory 160. The memory control section 140 receives the address 114 and the control signal 117 from the CPU 110 and receives the addresses 124 and 125 and the control signals 134 and 135 from the DSP 120. The memory control section 140 outputs an address 152 and a control signal 154 to the memory 150 and outputs an address 162 and a control signal 164 to the memory 160.

When the CPU 110 instructs reading or writing of data, the control section 118 in the CPU 110 activates the control signal 117.

When the control signal 117 is active, the memory control section 140 converts the address 114 into the address 152 or 162 in accordance with a prescribed conversion system.

Figure 2:
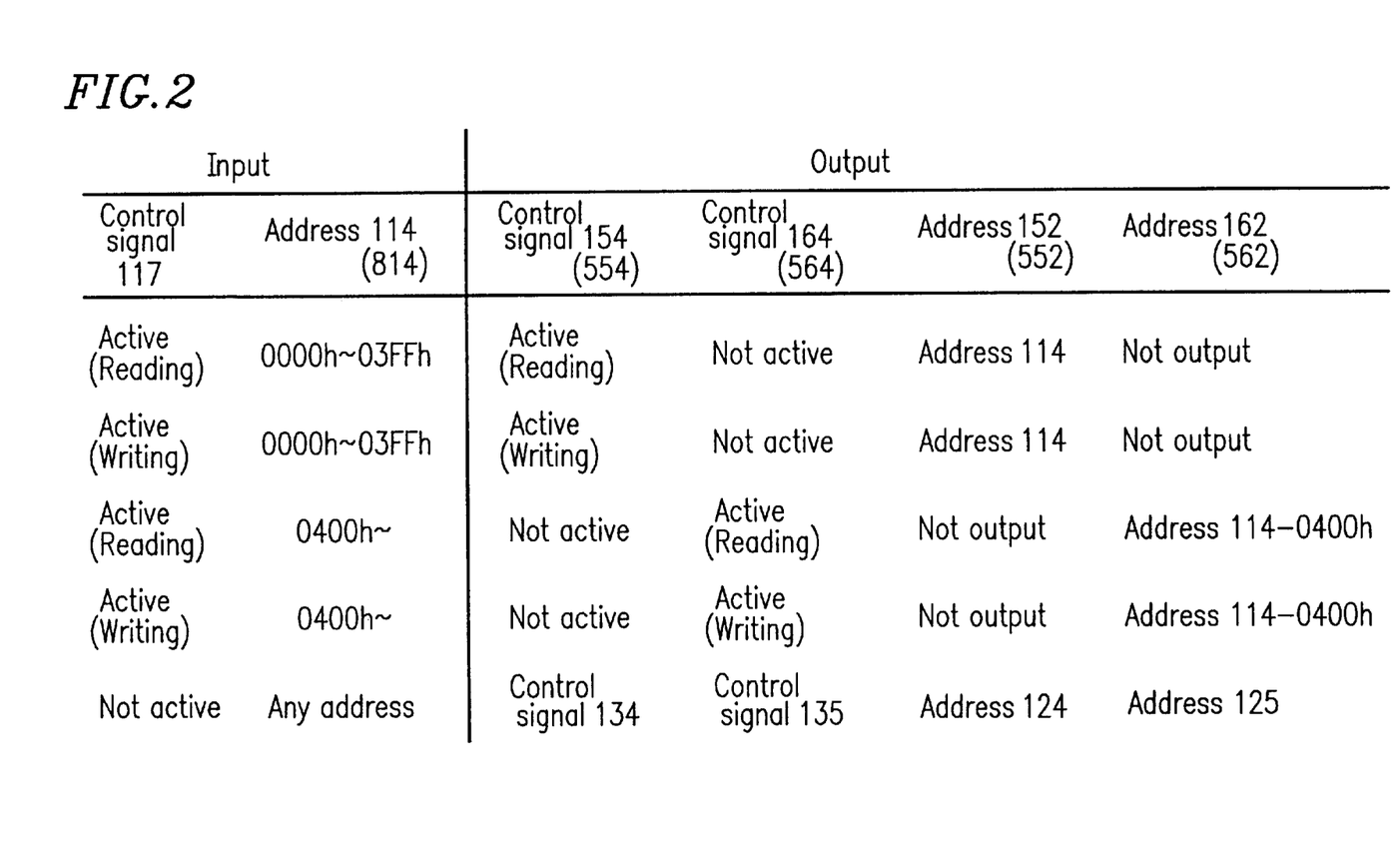
FIG. 2 shows an example of a prescribed conversion system used for converting an address generated by a CPU in the memory device according to the present invention.

FIG. 2 shows an example of the prescribed conversion system.

In this example, the memory 150 has a memory capacity of 1K words and the memory 160 has a memory capacity of 2K words. For the locations in the memories 150 and 160, addresses are sequentially designated from 0000h to a maximum value, respectively.

As shown in FIG. 2, when the value of the address 114 is in the range from 0000h to 03FFh, the memory control section 140 activates the control signal 154 and outputs the address 114 to the memory 150 as the address 152. As described above, letter "h" indicates that the value of the address is represented hexadecimally.

When the value of the address 114 is equal to or greater than 0400h, the memory control section 140 activates the control signal 164 and outputs a value which is obtained by subtracting the prescribed value 0400h from the value of the address 114 to the memory 160 as the address 162.

Returning to FIG. 1, when the DSP 120 instructs reading or writing of data, the control section 128 in the DSP 120 activates the control signal 134 or 135.

When the control signal 134 is active, the memory control section 140 activates the control signal 154 and outputs the address 124 to the memory 150 as the address 152.

When the control signal 135 is active, the memory control section 140 activates the control signal 164 and outputs the address 125 to the memory 160 as the address 162.

Figure 3:
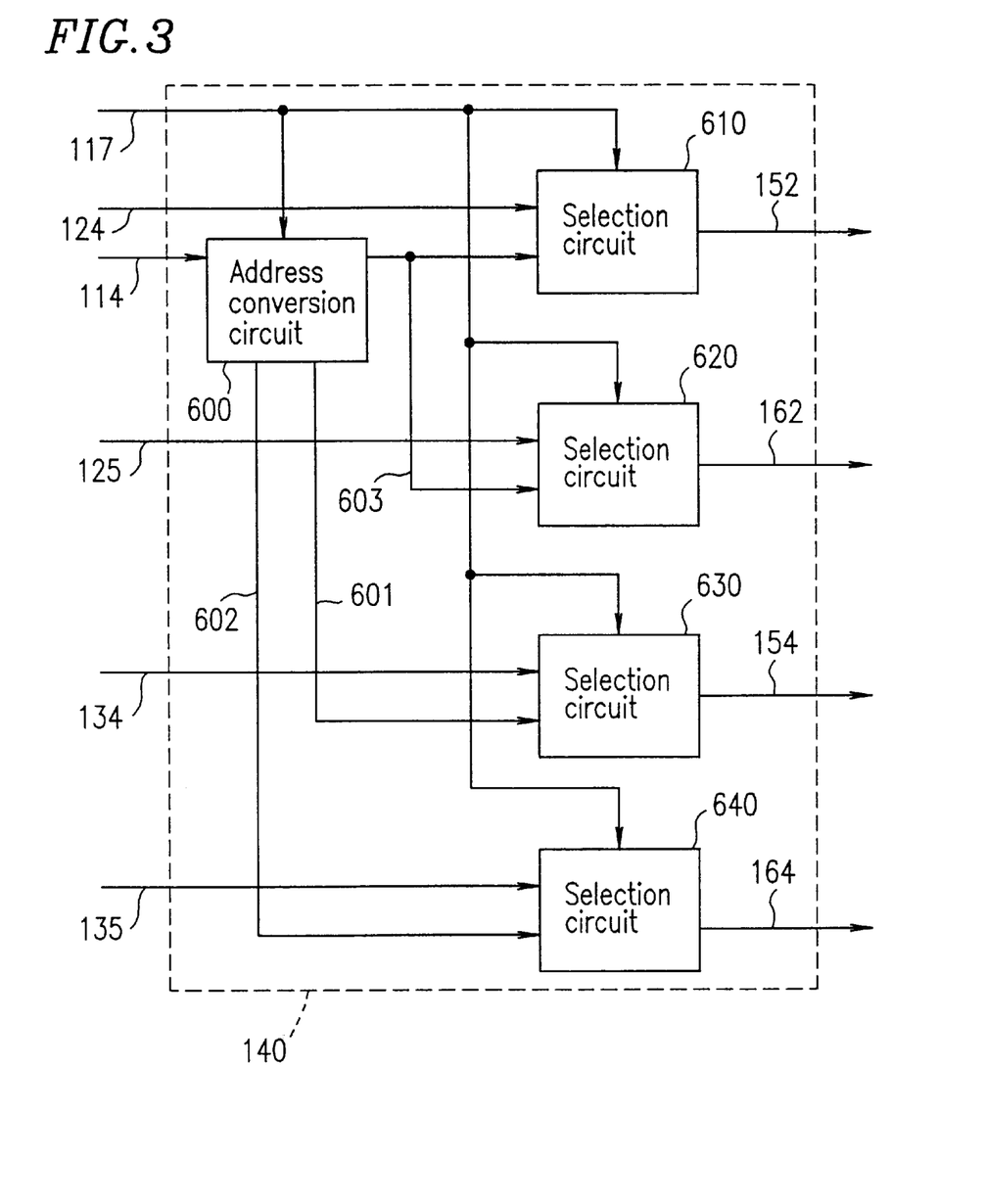
FIG. 3 shows a structure of a memory control section in the memory device shown in FIG. 1.

FIG. 3 shows an exemplary structure of the memory control section 140. The memory control section 140 shown in FIG. 3 has a function of receiving an access request from the CPU 110 with higher priority rather than an access request from the DSP 120.

The memory control section 140 includes an address conversion circuit 600 and selection circuits 610, 620, 630 and 640.

The control signal 117 is input to the address conversion circuit 600 and the selection circuits 610, 620, 630 and 640.

When the control signal 117 is active, the address conversion circuit 600 examines the value of the address 114. When the value of the address 114 is in the range from 0000h to 03FFh, the address conversion circuit 600 activates a control signal 601 and outputs the address 114 to the selection circuits 610 and 620 as an address 603. When the value of the address 114 is equal to or greater than 0400h, the address conversion circuit 600 activates a control signal 602 and outputs a value which is obtained by subtracting the prescribed value 0400h from the value of the address 114 to the selection circuits 610 and 620 as an address 603.

The selection circuit 610 selectively outputs the address 603 when the control signal 117 is active, and selectively outputs the address 124 otherwise. The output from the selection circuit 610 is supplied to the memory 150 as the address 152.

The selection circuit 620 selectively outputs the address 603 when the control signal 117 is active, and selectively outputs the address 125 otherwise. The output from the selection circuit 620 is supplied to the memory 160 as the address 162.

The selection circuit 630 selectively outputs the control signal 601 when the control signal 117 is active, and selectively outputs the control signal 134 otherwise. The output from the selection circuit 630 is supplied to the memory 150 as the control signal 154.

The selection circuit 640 selectively outputs the control signal 602 when the control signal 117 is active, and selectively outputs the control signal 135 otherwise. The output from the selection circuit 640 is supplied to the memory 160 as the control signal 164.

Figure 4:
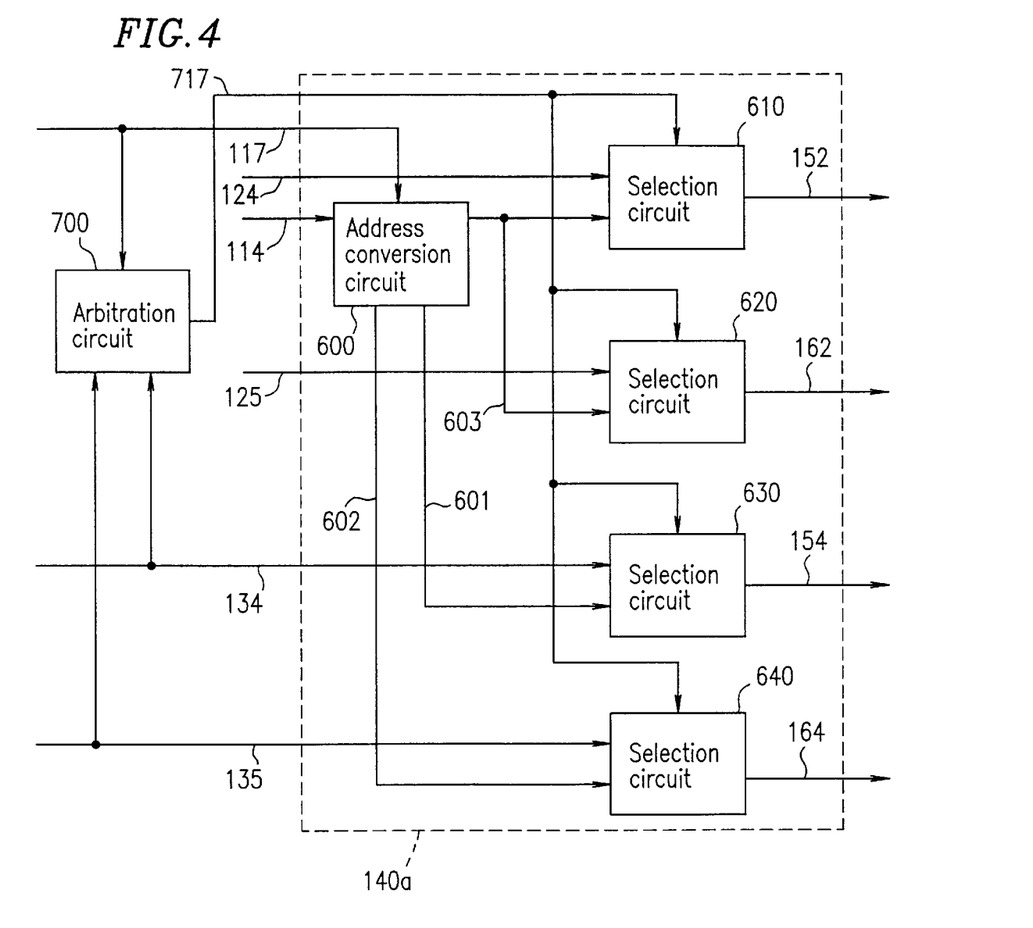
FIG. 4 shows a structure of a memory control section replaceable with the memory control section shown in FIG. 3.

FIG. 4 shows an exemplary structure of a memory control section 140a, which is replaceable with the memory control section 140. An arbitration circuit 700 is provided for arbitrating an access request from the CPU 110 and an access request from the DSP 120.

The arbitration circuit 700 outputs a control signal 717 in accordance with the control signals 117, 134 and 135. When the access request from the CPU 110 is given priority, the arbitration circuit 700 activates the control signal 717. When the access request from the DSP 120 is given priority, the arbitration circuit 700 does not activate the control signal 717.

The memory control section 140a has substantially the same structure as that of the memory control section 140 except that the control signal 717 is input to the selections circuits 610, 620, 630 and 640 in the memory control section 140a in lieu of the control signal 117. Identical elements previously discussed with respect to FIG. 3 bear identical reference numerals therewith in FIG. 4 and the descriptions thereof are omitted.

Hereinafter, exemplary operations of the memory device 1 will be described mainly with reference to FIG. 1.

(1) The DSP 120 reads data stored at 0002h in the memory 150 and at 0003h in the memory 160 in the following manner.

Step 1: The control section 128 in the DSP 120 outputs the control signals 134 and 135 when they are active, which instruct reading of the data, to the memory control section 140. The address generation section 126 outputs the address 124 having the value 0002h and the address 125 having the value 0003h to the memory control section 140.

Step 2: Since the control signals 134 and 135 are both active, the memory control section 140 outputs the address 124 to the memory 150 as the address 152 and outputs the address 125 to the memory 160 as the address 162. The memory control section 140 also outputs the control signal 154 when it is active (which instructs reading of the data) to the memory 150 and outputs the control signal 164 when it is active (which instructs reading of the data) to the memory 160. As a result, the data is read from 0002h in the memory 150 and from 0003h in the memory 160. The data read from 0002h in the memory 150 is input to the arithmetic operation section 122 in the DSP 120 via the data bus 105. The data read from 0003h in the memory 160 is also input to the arithmetic operation section 122 via the data bus 106.

(2) The CPU 110 reads data stored at 0002h in the memory 150 in the following manner.

Step 1: The control section 118 in the CPU 110 outputs the control signal 117 when it is active (which instructs reading of the data) to the memory control section 140. The address generation section 116 outputs the address 114 having the value 0002h to the memory control section 140.

Step 2: Since the control signal 117 is active and in the range from 0000h to 03FFh, the memory control section 140 outputs the address 114 to the memory 150 as the address 152 and outputs the control signal 154 when it is active (which instructs reading of the data) to the memory 150. As a result, the data is read from 0002h in the memory 150. The data read from 0002h in the memory 150 is input to the arithmetic operation section 112 in the CPU 110 via the data bus 105.

(3) The CPU 110 reads data stored at 0003h in the memory 160 in the following manner.

Step 1: The control section 118 in the CPU 110 outputs the control signal 117 when it is active (which instructs reading of the data) to the memory control section 140. The address generation section 116 outputs the address 114 having the value 0403h to the memory control section 140.

Step 2: Since the control signal 117 is active and the address 114 is greater than 0400h, the memory control section 140 outputs a value which is obtained by subtracting the prescribed value 0400h from the value 0403h of the address 114 (i.e., the value 0003h) to the memory 160 as the address 162 and outputs the control signal 164 when it is active (which instructs reading of the data) to the memory 160. As a result, the data is read from 0003h in the memory 160. The data read from 0003h in the memory 160 is input to the arithmetic operation section 112 in the CPU 110 via the data bus 105.

In this manner, the memory control section 140 converts the address 114 into the address 152 or 162 and activates the control signal 154 or 164 in accordance with whether or not the value of the address 114 generated by the address generation section 116 in the CPU 110 is in a prescribed range. Thus, the two-memories 150 and 160 can be accessed using one address 114.

EXAMPLE 2

Figure 5:
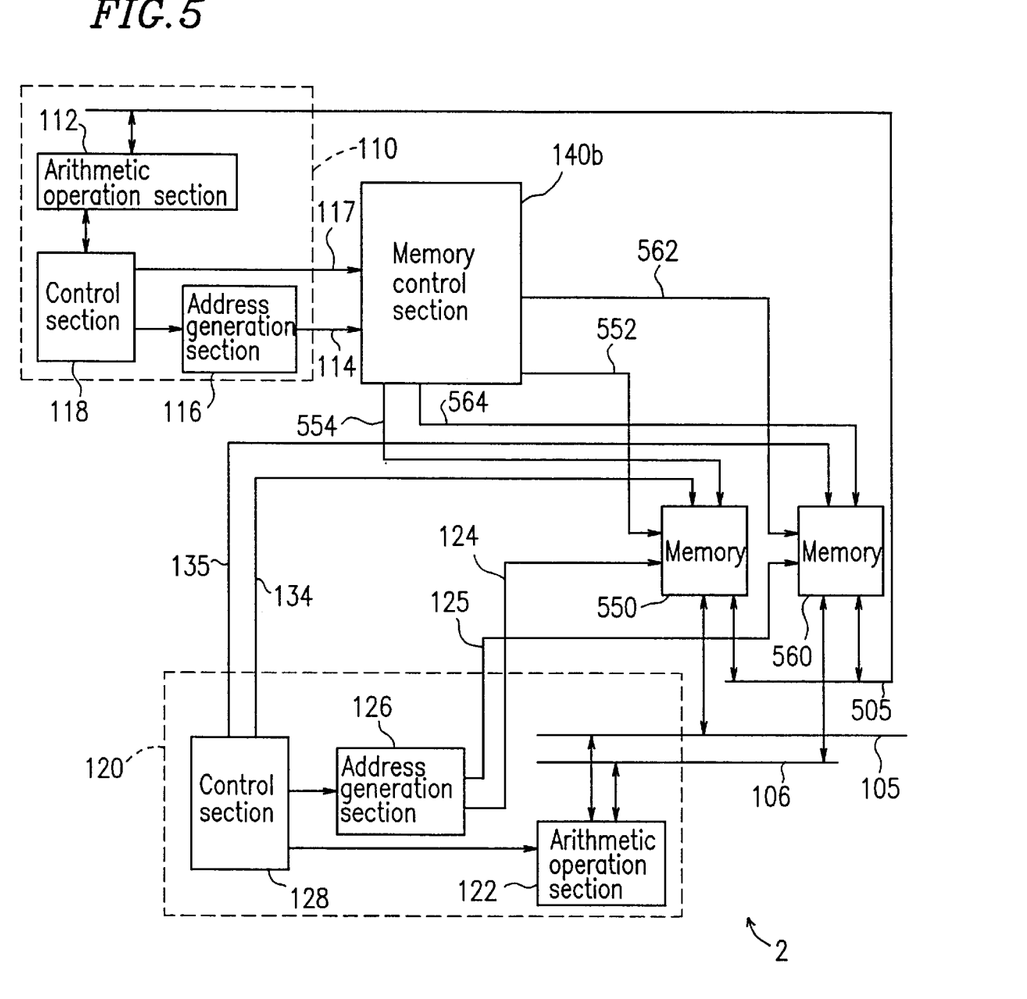
FIG. 5 is a block diagram of a memory device according to a second example of the present invention.

FIG. 5 is a block diagram of a memory device 2 according to a second example of the present invention.

As shown in FIG. 2, the memory device 2 includes memories 550 and 560. The memories 550 and 560 are each a dual-port memory.

The memory device 2 further includes a CPU 110, a DSP 120 and a memory control section 140b.

The CPU 110 and the DSP 120 both have the same structures as those shown in FIG. 1. The CPU 110 is connected to the memories 550 and 560 via a data bus 505. The DSP 120 is connected to the memory 550 via a data bus 105 and is connected to the memory 560 via a data bus 106.

When the CPU 110 instructs reading or writing of data, a control section 118 in the CPU 110 activates a control signal 117.

When the control signal 117 is active, the memory control section 140b converts an address 114 into an address 552 or 562 in accordance with a prescribed conversion system. The conversion system is shown in, for example, FIG. 2.

When the value of the address 114 is in the range from 0000h to 03FFh, the memory control section 140b activates a control signal 554 and outputs the address 114 to the memory 550 as the address 552.

When the control signal 554 is active, the memory 550 inputs or outputs data at a location designated by the address 552 through the data bus 505.

When the value of the address 114 is equal to or greater than 0400h, the memory control section 140b activates a control signal 564 and outputs a value which is obtained by subtracting the prescribed value 0400h from the value of the address 114 to the memory 560 as the address 562.

When the control signal 564 is active, the memory 560 inputs or outputs data at a location designated by the address 562 through the data bus 505.

When the control signal 117 is not active, the memory control section 140b does not activate the control signal 554 or 564.

Returning to FIG. 5, when the DSP 120 instructs reading or writing of data, a control section 128 in the DSP 120 activates a control signal 134 or 135.

When the control signal 134 is active, the memory 550 inputs or outputs data at a location designated by the address 124 through the data bus 105.

When the control signal 135 is active, the memory 560 inputs or outputs data at a location designated by the address 125 through the data bus 106.

In this manner, the memory control section 140b converts the address 114 into the address 552 or 562 and activates the control signal 554 or 564 in accordance with whether or not the value of the address 114 generated by an address generation section 116 in the CPU 110 is in a prescribed range. Thus, the two memories 550 and 560 can be accessed using one address 114.

EXAMPLE 3

Figure 6:
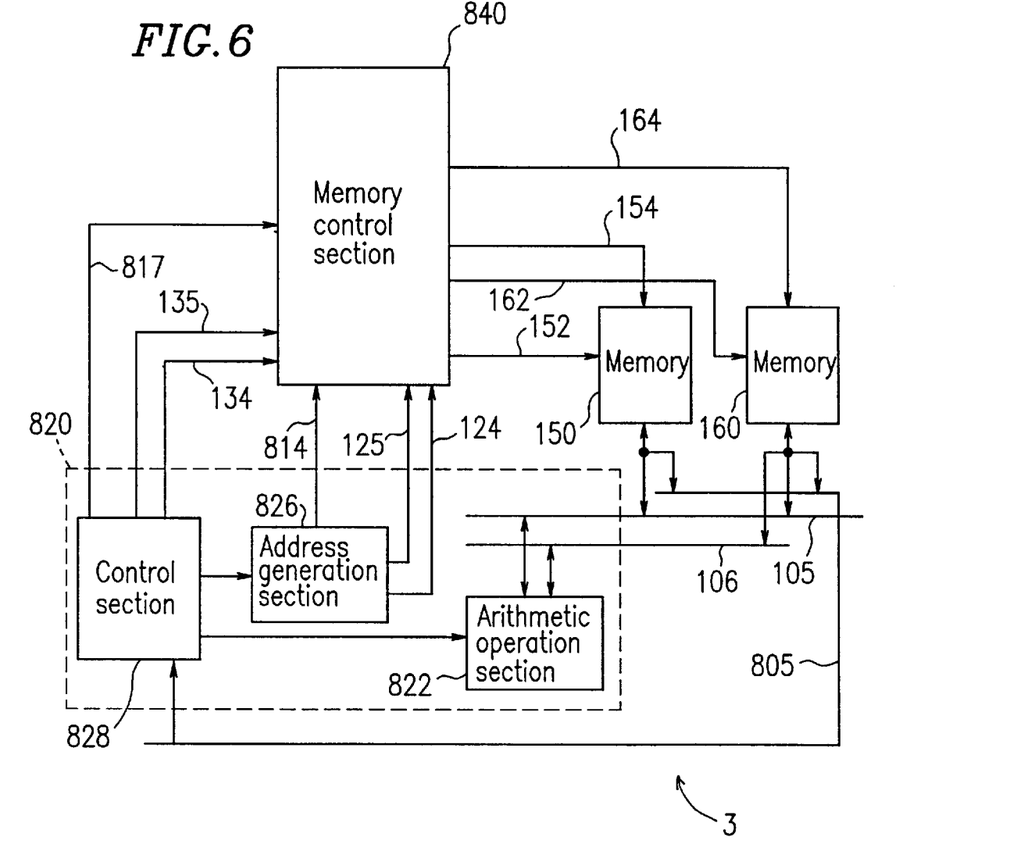
FIG. 6 is a block diagram of a memory device according to a third example of the present invention.

FIG. 6 is a block diagram of a memory 3 according to a third example of the present invention.

As shown in FIG. 6, the memory device 3 includes memories 150 and 160. The memories 150 and 160 are each a single-port memory.

The memory device 3 further includes a processor 820 and a memory control section 840. The processor 820 is connected to the memories 150 and 160 via a data bus 805. The processor 820 is also connected to the memory 150 via a data bus 105 and is connected to the memory 160 via a data bus 106.

The processor 820 includes an arithmetic operation section 822, an address generation section 826 and a control section 828.

The arithmetic operation section 822 processes data which is input to the arithmetic operation section 822 via the data buses 105 and 106.

The address generation section 826 generates an address 814. The address 814 defines a location to be accessed in the memory 150 or a location to be accessed in the memory 160. The address generation section 826 also generates addresses 124 and 125. The address 124 defines a location to be accessed in the memory 150, and the address 125 defines a location to be accessed in the memory 160.

The control section 828 outputs control signals 817, 134 and 135 to the memory control section 840. The control section 828 also controls the arithmetic operation section 822 and the address generation section 826.

The memory control section 840 has substantially the same structure as that of the memory control section 140 shown in FIG. 1 except that the control signal 817 is input in lieu of the control signal 117 and that the address 814 is input in lieu of the address 114 in the memory control section 840.

For inputting the data read from the memories 150 and 160 to the control section 828 via the data bus 805, the control section 828 activates a control signal 817 and controls the address generation section 826 to generate the address 814.

When the control signal 817 is active, the memory control section 840 converts the address 814 into an address 152 or 162 in accordance with a prescribed conversion system. The conversion system is shown in, for example, FIG. 2.

When the value of the address 814 is in the range from 0000h to 03FFh, the memory control section 840 activates a control signal 154 and outputs the address 814 to the memory 150 as the address 152.

When the value of the address 814 is equal to or greater than 0400h, the memory control section 840 activates a control signal 164 and outputs a value which is obtained by subtracting the prescribed value 0400h from the value of the address 814 to the memory 160 as the address 162.

Returning to FIG. 6, the control section 828 decodes the data read from the memories 150 and 160 as instructions.

For inputting the data read from the memories 150 and 160 to the arithmetic operation section 822 via the data buses 105 and 106, or for writing the data output from the arithmetic operation section 822 to the memories 150 and 160 via the data buses 105 and 106, the control section 828 activates control signal 134 or 135 and controls the address generation section 826 to control the address 124 or 125.

When the control signal 134 is active, the memory control section 840 activates the control signal 154 and outputs the address 124 to the memory 150 as the address 152.

When the control signal 135 is active, the memory control section 840 activates the control signal 164 and outputs the address 125 to the memory 160 as the address 162.

In this manner, the memory control section 840 converts the address 814 into the address 152 or 162 and activates the control signal 154 or 164 in accordance with whether or not the value of the address 814 generated by an address generation section 826 is in a prescribed range. Thus, the two memories 150 and 160 can be accessed using one address 814.

In the first, second and third examples, the address conversion is performed by subtracting the prescribed value 0400h from the value of the address 114 (or the address 814). The prescribed value is not limited to 0400h. The prescribed value may be an arbitrary value which exceeds the memory capacity of the respective memory 150 (or 550) or 160 (or 560).

Alternatively, the address conversion may be performed by arithmetic operations other than subtracting a prescribed value from the value of the address 114 (or the address 814). For example, when the value of the address 114 (or the address 814) is in a prescribed range, the address conversion can be performed by setting a specific bit of the address 114 (or the address 814) to "1" or "0". For instance, when the address 114 (or the address 814) has a value of 0403h, the bit 10 of the address 114 (or the address 814) is reset. Thus, the value of the address 114 (or the address 814) is converted to 0003h.

Needless to say, the bit widths of the address 114 (or 814), the address 124, the address 125, the address 152 (or 552), and the address 162 (or 562) are not limited to the widths described in the examples.

In a memory device according to the present invention, a first address which defines the location to be accessed in a first memory and a second address which defines the location to be accessed in a second memory are generated by a first processor. The first memory is accessed based on the first address, and the second memory is accessed based on the second address. A third address is generated by a second processor. The third address is converted by an address conversion section. Based on the third address obtained by the conversion so as to represent either one of the first address and the second address, the first or the second memory is accessed.

Thus, according to the present invention, it is possible to access the first memory or the second memory based on two addresses (the first address and the second address) and also to access the first memory or the second memory based on one address (the third address). In this manner, memory access can be realized from both the first processor and the second processor with satisfactory efficiency.

In another memory device according to the present invention, two addresses (the first address and the second address) and one address (the third address) are generated in one processor. Thus, satisfactorily efficient memory access can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A memory device, comprising:
   a first single-port memory;
   a second single-port memory;
   a first processor for generating a first address for defining a location to be accessed in the first single-port memory, a first control signal for activating the first single-port memory, a second address for defining a location to be accessed in the second single-port memory, and a second control signal for activating the second single-port memory;
   a second processor for generating a third address not compatible with the first and second single-port memories; and
   a memory control section for controlling access to the first single-port memory and access to the second single-port memory, the memory control section including an address conversion section for converting the third address so as to represent either one of the first address and the second address, and for generating either one of the first control signal and the second control signal based on at least a portion of the third address.

2. A memory device according to claim 1, wherein the address conversion section converts the third address so as to represent one of the first address and the second address by subtracting a prescribed value from a value of the third address.

3. A memory device according to claim 1, wherein the address conversion section converts the third address so as to represent one of the first address and the second address by setting a prescribed bit of the third address to either one of "1" and "0".

4. A memory device according to claim 1, wherein the first processor, the second processor and the memory control section are provided on a single semiconductor chip.

5. A memory device as set forth in claim 1, wherein the memory control section allows the first processor to simultaneously access the first and second memories.

6. A memory device, comprising;
   a first single-port memory;
   a second single-port memory;
   a processor for generating a first address for defining a location to be accessed in the first single-port memory, a first control signal for activating the first single-port memory, a second address for defining a location to be accessed in the second single-port memory, a second control signal for activating the second single-port memory, and a third address not compatible with the first and second single-port memories; and
   a memory control section for controlling access to the first single-port memory and access to the second single-port memory, the memory control section including an address conversion section for converting the third address so as to represent either one of the first address and the second address, and for generating either one of the first control signal and the second control signal based on at least a portion of the third address.

7. A memory device as set forth in claim 6, wherein the memory control section allows the first processor to simultaneously access the first and second memories.

8. A memory device as set forth in claim 6, wherein the address conversion section determines whether the third address is greater than a predetermined value and, if so, converts the third address by a predetermined calculation into an address representing the second address whereby the second processor can access the second memory.

9. A memory device as set forth in claim 8, wherein the address conversion section converts the third address into the address representing the second address by subtracting the predetermined value from the third address.

10. A method as set forth in claim 9, wherein the step of converting the third address comprises determining whether the third address is greater than a predetermined value and, if so, converting the third address by a predetermined calculation into an address representing the second address whereby the second processor can access the second memory.

11. A method as set forth in claim 9, wherein the step of converting the third address into the address representing the second address comprises subtracting the predetermined value from the third address.

12. A method for accessing a first single-port memory and a second single-port memory in a memory device, the method comprising the steps of:

generating a first address for defining a location to be accessed in the first single-port memory and a second address for defining a location to be accessed in the second single-port memory;

generating a third address not compatible with the first and second single-port memories; and controlling access to the first single-port memory and access to the second single-port memory with a first control signal and a second control signal, wherein the step of controlling includes the step of converting the third address so as to represent either one of the first address and the second address, and for generating either one of the first control signal and the second control signal.

13. A method according to claim 12, wherein the step of converting includes the step of subtracting a prescribed value from a value of the third address.

14. A method according to claim 12, wherein the step of converting includes the step of setting a prescribed bit of the third address to either one of "1" and "0".

15. A method as set forth in claim 12, further comprising the step of simultaneously accessing the first and second memories.

16. A method as set forth in claim 12, wherein:

the step of generating the first address comprises generating an address within a certain range;

the step of generating the second address comprises generating an address within the same range as the first address;

the step of generating the third address comprises generating an address within at least twice that of the range of the first and second addresses; and the step of converting the third address comprises determining whether the third address is greater than an upper limit of the range of the first and second addresses, and if so, subtracting this upper limit from the third address to represent the second address.

17. A memory device, comprising:

a first memory having an address port which receives a first address in order to access the first memory;

a second memory having an address port which receives a second address in order to access the second memory;

a first processor and a second processor, the first processor being configured to generate the first address for defining a location to be accessed in the first memory and the second address for defining a location to be accessed in the second memory, and the second processor being configured to generate a third address which in one case represents a location to be accessed in the first memory and in another case represents a location to be accessed in the second memory; and a memory control section for controlling access to the first memory and access to the second memory, the memory control section including an address conversion section for converting the third address received from the second processor according to a predefined criteria so as to generate the first address in the one case and the second address in the another case.

18. A memory device as set forth in claim 17, wherein the memory control section allows the first processor to simultaneously access the first and second memories.

19. A memory device as set forth in claim 17, wherein the address conversion section determines whether the third address is greater than a predetermined value and, if so, converts the third address by a predetermined calculation into an address representing the second address whereby the second processor can access the second memory.

20. A memory device as set forth in claim 19, wherein the address conversion section converts the third address into the address representing the second address by subtracting the predetermined value from the third address.

21. A memory device, comprising:

a first single-port memory;

a second single-port memory;

a first processor for generating a first address for defining a location to be accessed in the first single-port memory, a first control signal for activating the first single-port memory, a second address for defining a location to be accessed in the second single-port memory, and a second control signal for activating the second single-port memory;

a second processor for generating a third address not compatible with the first and second single-port memories;

a memory control section for controlling access to the first single-port memory and access to the second single-port memory, the memory control section including an address conversion section for converting the third address so as to represent either one of the first address and the second address, and for generating either one of the first control signal and the second control signal based on at least a portion of the third address; and an arbitration circuit for arbitrating an access request from the first processor and the second processor.

22. A memory device, comprising:

a first single-port memory;

a second single-port memory;

a first processor which generates a first address that defines a location to be accessed in the first single-port memory, a first control signal for activating the first single-port memory, a second address that defines a location to be accessed in the second single-port memory, and a second control signal for activating the second single-port memory;

a second processor which generates a third address not compatible with the first single-port memory and the second single-port memory; and a memory control section which allows the first processor simultaneous access to both the first single-port memory and the second single-port memory, the memory control section including an address conversion section capable of converting the third address so as to represent both the first and second memories whereby the third address may be converted to represent either one of the first address and the second address, and for generating either one of a first control signal and a second control signal.

* * * * *